(12) United States Patent
Sangameswaran et al.

(10) Patent No.: US 8,702,563 B1
(45) Date of Patent: Apr. 22, 2014

(54) SYSTEM AND METHOD FOR CONTROLLING A STOP-START SYSTEM FOR A VEHICLE ENGINE

(71) Applicant: Ford Global Technologies, LLC, Dearborn, MI (US)

(72) Inventors: Sangeetha Sangameswaran, Troy, MI (US); Mathew Alan Boesch, Plymouth, MI (US); Scott R. Caudill, Saline, MI (US); Mark Douglas Malone, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/690,936

(22) Filed: Nov. 30, 2012

(51) Int. Cl.
  *B60W 10/04* (2006.01)
(52) U.S. Cl.
  USPC .......................................................... 477/111
(58) Field of Classification Search
  USPC .......................................................... 477/111
  See application file for complete search history.

(56) References Cited

U.S. PATENT DOCUMENTS

| | | | | |
|---|---|---|---|---|
| 4,364,343 | A * | 12/1982 | Malik | 123/179.4 |
| 6,190,284 | B1 * | 2/2001 | Kuroda et al. | 477/107 |
| 6,676,565 | B2 | 1/2004 | Mizutani | |
| 6,802,291 | B2 * | 10/2004 | Ujifusa | 123/179.4 |
| 6,830,534 | B2 * | 12/2004 | Seibertz et al. | 477/92 |
| 6,885,113 | B2 | 4/2005 | Lim | |
| 8,550,959 | B2 * | 10/2013 | Ueki | 477/110 |
| 8,574,123 | B2 * | 11/2013 | Nedorezov et al. | 477/92 |
| 8,616,169 | B2 * | 12/2013 | Levasseur et al. | 123/179.4 |
| 2010/0076634 | A1 | 3/2010 | Brigham | |
| 2011/0166745 | A1 | 7/2011 | Tiwari et al. | |
| 2012/0010792 | A1 | 1/2012 | Nedorezov et al. | |
| 2012/0116657 | A1 | 5/2012 | Kawamoto | |
| 2014/0011637 | A1 * | 1/2014 | Hayashi et al. | 477/99 |

FOREIGN PATENT DOCUMENTS

EP   1052399 A2   11/2000

* cited by examiner

*Primary Examiner* — Dirk Wright
(74) *Attorney, Agent, or Firm* — David B. Kelley; Brooks Kushman, P.C.

(57) ABSTRACT

A system and method for controlling a start-stop system for an engine in a vehicle includes automatically stopping the engine with a transmission gear lever of the vehicle in DRIVE. The engine is automatically restarted when the vehicle is shifted out of DRIVE and at least one condition is met. The at least one condition includes a final position of the gear lever. Automatic restarting of the engine is suppressed when the vehicle is shifted out of DRIVE and at least one other condition is met; the at least one other condition also including a final position of the gear lever.

20 Claims, 2 Drawing Sheets

SYSTEM AND METHOD FOR CONTROLLING A STOP-START SYSTEM FOR A VEHICLE ENGINE

TECHNICAL FIELD

The present invention relates to a system and method for controlling a stop-start system for an engine in a vehicle.

BACKGROUND

In vehicles with enhanced starter motor technology, for example, micro hybrid vehicles, the engine is automatically stopped and restarted by a control system under certain conditions—e.g., when the vehicle is stopped. One type of start-stop system for a vehicle with an automatic transmission is a "Stop-in-Drive" system (SID). In such a system, the engine will only be autostopped when the transmission gear lever is in the "DRIVE" position. The engine is restarted when the gear lever is moved out of DRIVE.

In a SID system there are situations where the driver arrives at the end of their journey, brings the vehicle to a stop, and assuming all other autostop criteria are met, the engine autostops while still in DRIVE. If the driver moves the gear lever out of DRIVE, the engine automatically restarts. This may not be desirable, however, as the driver's intention may be to move the gear lever to "PARK" and "key-off" the vehicle. Although it may be desirable to maintain an autostopped condition when the gear lever is moved from DRIVE to PARK, it may not be when the gear lever is moved out of DRIVE to "REVERSE".

Therefore, a need exists for a system and method to control an engine in a vehicle such that after being autostopped while the vehicle is in DRIVE, and the transmission gear lever is shifted out of DRIVE, the vehicle engine will be automatically restarted under certain conditions, but not others.

SUMMARY

At least some embodiments of the present invention include a method for controlling a start-stop system for an engine in a vehicle, including automatically restarting the engine under at least one condition that includes a final position of a transmission gear lever, and suppressing automatic restarting of the engine under at least one other condition that includes the final position of the gear lever, when the engine has been autostopped with the vehicle in DRIVE and the gear lever is shifted out of DRIVE.

At least some embodiments of the present invention include a method for controlling a start-stop system for an engine in a vehicle, including autostopping the engine with a transmission gear lever of the vehicle in DRIVE. The method also includes autostarting the engine based on at least one condition including a final position of the gear lever, and suppressing autostarting of the engine based on at least one other condition including a final position of the gear lever, when the vehicle is shifted out of DRIVE.

At least some embodiments of the present invention include a control system for controlling a start-stop system for an engine in a vehicle, including a controller configured to autostart the engine under at least one condition including a final position of a transmission gear lever, and suppress engine autostart under at least one other condition including the final position of the gear lever, when the engine has been autostopped with the vehicle in DRIVE and the gear lever is shifted out of DRIVE.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
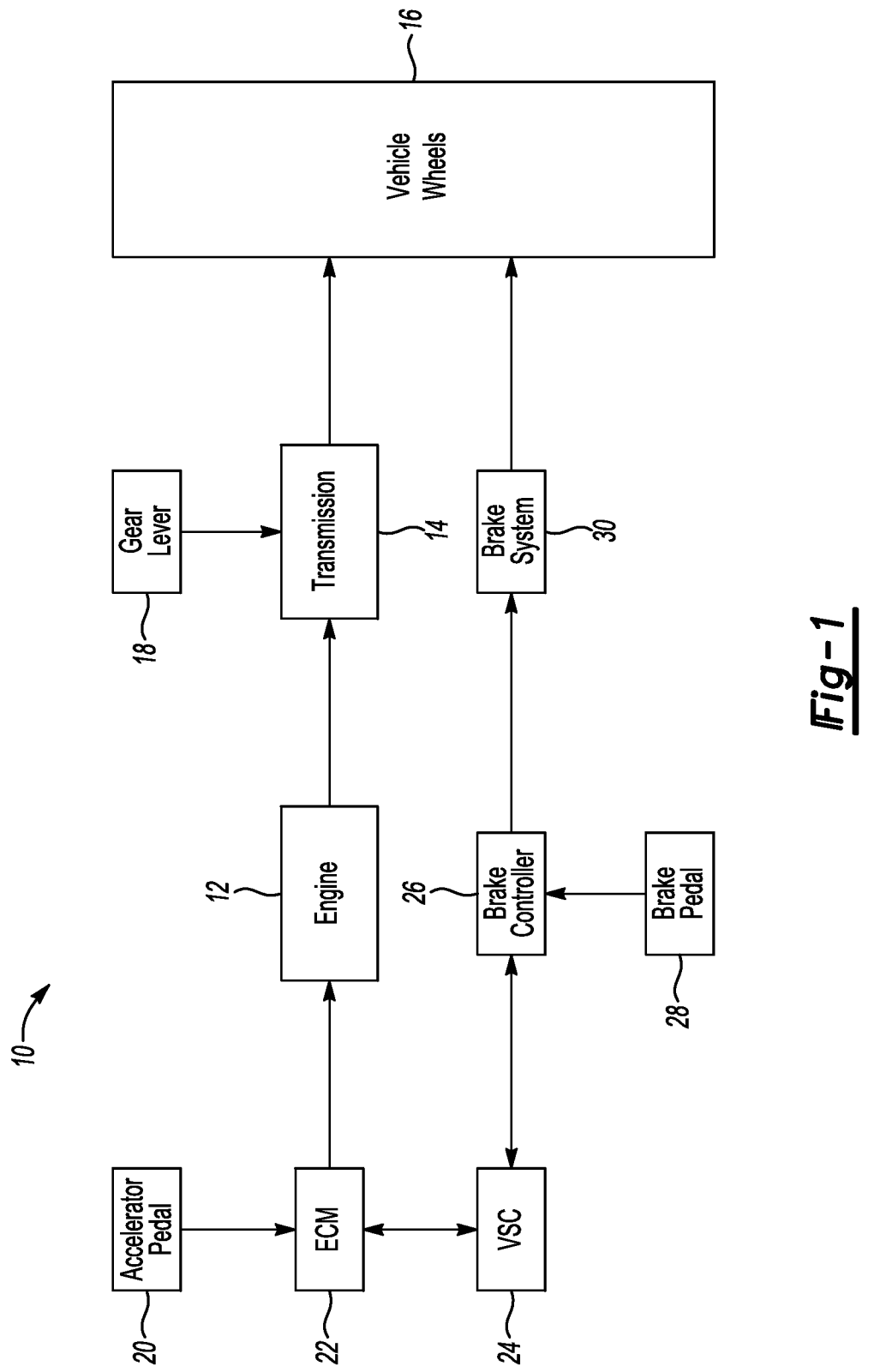
FIG. 1 shows a simplified schematic diagram of a vehicle having a control system in accordance with embodiments of the present invention.

FIG. 1 shows a vehicle 10 including an engine 12 having an output directed to a transmission 14, which in turn transfers power to vehicle wheels 16. A gear lever 18 provides operator input to the transmission 14. Similarly, an accelerator pedal 20 provides operator input to an engine control module (ECM) 22, which provides control signals to the engine 12. The ECM 22 communicates with a vehicle system controller (VSC) 24, which in turn communicates with a brake controller 26. The brake controller 26 receives operator input through a brake pedal 28, and controls a friction brake system 30, which is operable to apply a braking force to the vehicle wheels 16.

As noted above, embodiments of the present invention include a control system for controlling a start-stop system for an engine in a vehicle, such as the engine 12 and the vehicle 10. Such a control system may be embodied by one or more controllers, such as the ECM 22 or the VSC 24, but more generally may include any number of hardware and/or software controllers residing in different parts of the vehicle and communicating with one another, for example, through a controller area network (CAN). One goal of a vehicle start-stop system is to automatically stop the engine under certain conditions, while restarting it automatically when conditions change. This provides greater fuel economy and reduced emissions.

In some start-stop systems, the engine may be automatically stopped when all of a certain set of conditions are met. For example, if the gear lever is in DRIVE, the brake pedal is pressed, the accelerator pedal is released, and the vehicle speed is close to zero, the engine may be automatically stopped. Another condition that may be included in this set of conditions is that no vehicle subsystem requires the engine to be running—e.g., high power-consuming subsystems such as air conditioning or power steering. In a start-stop system where all conditions are required to be met before the engine is autostopped, not only will the start-stop system keep the engine from being automatically stopped if any of the conditions in the set are not met, but once having been autostopped, the engine may be automatically restarted if any of the conditions change.

Continuing then with the example from above, if the engine has been autostopped while the vehicle is in DRIVE, the engine will be automatically restarted if the operator shifts out of DRIVE. As discussed above, this may be undesirable, particularly if the operator intends to place a vehicle in PARK, and shut the engine off. Therefore, in at least some embodiments of the present invention, a controller, which may be for example the engine controller 22, is configured to account for these different requirements. For example, when the engine has been autostopped with the vehicle in DRIVE, and the gear lever 18 of the transmission 14 is shifted out of DRIVE, the controller 22 is configured to automatically restart the engine 12 under at least one condition, and to suppress automatic restarting the engine 12 under at least one other condition.

In at least one embodiment of the present invention, the at least one condition may include the gear lever 18 being moved from DRIVE to a final position of "NEUTRAL", and may further include the gear lever 18 remaining in NEUTRAL longer than a predetermined time. If this occurs, the controller 22 will cause the engine 12 to be automatically restarted. Conversely, the at least one other condition may include the gear lever 18 being moved from DRIVE to a final position of PARK; in such a case automatic restarting of the engine 12 is suppressed. The at least one condition may also include the gear lever 18 being moved from DRIVE to a final position of REVERSE, and may further include the brake pedal 20 of the vehicle 10 being pressed; in this case, the engine 12 will be automatically restarted.

If the gear lever 18 is moved from DRIVE to REVERSE, and the brake pedal 20 is not pressed, a controller, such as the VSC 24, may provide a driver alert to indicate the need to press the brake pedal 20 for the engine 12 to automatically restart. In such a case, the at least one condition described above may further include the brake pedal 20 being pressed within a predetermined time after the alert, whereupon the engine 12 is automatically restarted. If, however, the brake pedal 12 is not pressed within the predetermined time after the alert, a controller, such as the VSC 24 or the ECM 22, may deactivate the start-stop system. Stated another way, the at least one other condition includes the final position of the gear lever 18 being REVERSE and also includes the brake pedal 12 not being pressed within the predetermined time after the alert. In this case, the vehicle operator would need to manually (key-on) the vehicle in order to start the engine 12.

Figure 2:
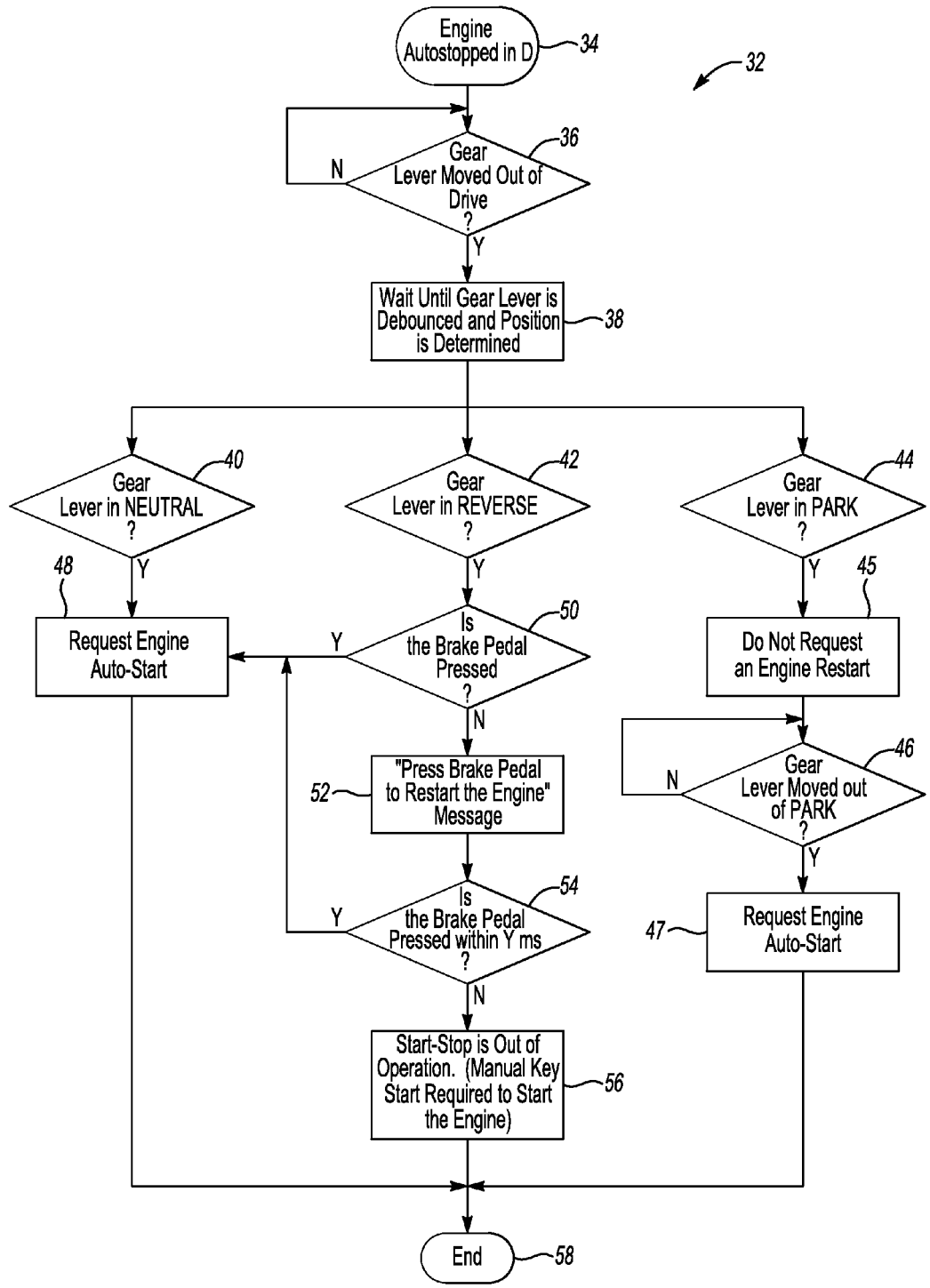
FIG. 2 is a flow chart illustrating a method in accordance with embodiments of the present invention.

FIG. 2 shows a flowchart 32 illustrating a method in accordance with an embodiment of the present invention. The method starts at step 34, where the engine has been stopped while the vehicle is in DRIVE. This will generally require at least one predetermined condition to be met, such as the vehicle speed being close to zero and the brake pedal being pressed. The method may be implemented, for example, by a controller or controllers such as the controllers 22, 24, 26 described above. In general, after the engine 12 has been autostopped while the vehicle is in DRIVE, the engine 12 will be automatically restarted under at least one condition, while autostart of the engine 12 will be suppressed under at least one other condition.

At decision block 36, it is determined whether the gear lever 18 has been moved out of the DRIVE position. If it has not, the method loops back to make the inquiry again, repeating the step until it is determined that the gear lever 18 has been moved out of DRIVE. At step 38, the new position of the gear lever 18 is determined; it may be desirable, however, to make this determination only after a predetermined time has elapsed. The predetermined time may be referred to as a "debounce period", and may be, for example, between 0.1 and 1 seconds—i.e., a time range covering most drivers' shifting habits. Including this temporal requirement as part of the at least one condition helps to ensure that transient movements of a gear lever, such as the gear lever 18, are not undesirably acted upon by the control system, and it is a "final" position of the gear lever 18 that is determined.

The next three decision block 40, 42, 44 respectively determine whether the gear lever 18 has been moved into NEUTRAL, REVERSE or PARK. If the determination is made at decision block 44 that the gear lever 18 has been moved from DRIVE to a final position of PARK, the previously referred to "at least one other condition" is met and automatic restarting of the engine is suppressed as shown in step 45. If, at decision block 46 it is determined that the gear lever 18 is moved out of PARK, the engine restart is then requested at step 47. If, however, at decision block 46 it is determined that the gear lever 18 has not been moved out of PARK, the method loops back to make the inquiry again. If at decision block 40 it is determined that the gear lever 18 has been moved from DRIVE to a final position of NEUTRAL, then another of the "at least one condition" has been met (along with the temporal requirement determined at step 38), and the engine 12 is automatically restarted as shown in step 48.

Turning now to decision block 42, where it is determined whether the gear lever 18 has been moved to REVERSE, a positive response to the inquiry indicates that another of the "at least one condition" has been met (along with the temporal requirement determined at step 38), and the engine 12 is automatically restarted as shown in step 48. If, however, the answer at decision block 50 is negative, the driver is provided with an alert at step 52 indicating that the brake pedal 20 needs to be engaged in order to automatically restart the engine 12. If at decision block 54 it is determined that the brake pedal 20 is pressed within a predetermined time after the alert is provided in step 52, the method moves to step 48 where the engine 12 is automatically restarted. If, however, the brake pedal 20 is not pressed within the predetermined time after the alert, the at least one other condition is met, the start-stop system is deactivated at step 56 and a manual key start is required. The method is shown as ending at step 58.

Embodiments of the present invention also provide a control system and method for automatically restarting an engine, such as the engine 12, when it has been autostopped with the vehicle in PARK. In at least one embodiment, the engine 12 is autostopped while the vehicle is in PARK, and when the gear lever 18 is moved out of PARK, the engine 12 is automatically restarted. The engine 12 may also be automatically restarted after it has been autostopped while the vehicle is in PARK, if at least one vehicle subsystem requires the engine 12 to be running in order to maintain functionality of the subsystem. For example, electrical subsystems that have high power requirements, such as an air conditioning system, may cause an automatic restart the engine 12 even if the vehicle remains in PARK. Another condition that may cause an automatic restarting of the engine 12 after it has been autostopped with the vehicle in PARK, is the accelerator pedal being pressed. Thus, in addition to providing flexibility in a start-stop system that autostops the engine when the vehicle is in DRIVE, the aforementioned method provides a "Stop-in-Park" system that may provide even greater fuel economy and emissions reduction.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a start-stop system for an engine in a vehicle, comprising:
automatically restarting the engine under at least one condition that includes a final position of a transmission gear lever, and suppressing automatic restarting of the engine under at least one other condition that includes the final position of the gear lever, when the engine has been autostopped with the vehicle in DRIVE and the gear lever is shifted out of DRIVE.

2. The method of claim 1, wherein the at least one condition includes the final position of the gear lever being NEUTRAL and further includes the gear lever remaining in NEUTRAL longer than a predetermined time, whereupon the engine is automatically restarted.

3. The method of claim 1, wherein the at least one other condition includes the final position of the gear lever being PARK, whereupon automatic restarting of the engine is suppressed.

4. The method of claim 1, wherein the at least one condition includes the final position of the gear lever being REVERSE and further includes a brake pedal of the vehicle being pressed, whereupon the engine is automatically restarted.

5. The method of claim 1, further comprising alerting a driver of the vehicle to press a brake pedal when the final position of the gear lever is REVERSE and the brake pedal is not pressed.

6. The method of claim 5, wherein the at least one condition includes the final position of the gear lever being REVERSE and further includes the brake pedal being pressed within a predetermined time after the alert, whereupon the engine is automatically restarted.

7. The method of claim 6, wherein the at least one other condition includes the brake pedal not being pressed within the predetermined time after the alert, whereupon automatic restarting of the engine is suppressed.

8. A method for controlling a start-stop system for an engine in a vehicle, comprising:
    autostopping the engine with a transmission gear lever of the vehicle in DRIVE; and
    autostarting the engine based on at least one condition including a final position of the gear lever, and suppressing autostarting of the engine based on at least one other condition including a final position of the gear lever, when the vehicle is shifted out of DRIVE.

9. The method of claim 8, wherein the at least one condition includes the final position of the gear lever being NEUTRAL and further includes the gear lever remaining in NEUTRAL longer than a predetermined time, whereupon the engine is automatically restarted.

10. The method of claim 8, wherein the at least one other condition includes the final position of the gear lever being PARK, whereupon automatic restarting of the engine is suppressed.

11. The method of claim 8, wherein the at least one condition includes the final position of the gear lever being REVERSE and further includes a brake pedal of the vehicle being pressed, whereupon the engine is automatically restarted.

12. The method of claim 8, further comprising automatically restarting the engine when the engine has been autostopped with the vehicle in PARK and the vehicle is shifted out of PARK.

13. The method of claim 8, further comprising automatically restarting the engine when the engine has been autostopped with the vehicle in PARK and at least one vehicle system requires the engine to be running.

14. The method of claim 8, further comprising automatically restarting the engine when the engine has been autostopped with the vehicle in PARK and an accelerator pedal is pressed.

15. A control system for controlling a start-stop system for an engine in a vehicle, comprising:
    a controller configured to autostart the engine under at least one condition including a final position of a transmission gear lever, and suppress engine autostart under at least one other condition including the final position of the gear lever, when the engine has been autostopped with the vehicle in DRIVE and the gear lever is shifted out of DRIVE.

16. The control system of claim 15, wherein the at least one condition includes the final position of the gear lever being NEUTRAL and further includes the gear lever remaining in NEUTRAL longer than a predetermined time, whereupon the engine is automatically restarted.

17. The control system of claim 15, wherein the at least one other condition includes the final position of the gear lever being PARK, whereupon automatic restarting of the engine is suppressed.

18. The control system of claim 15, wherein the at least one condition includes the final position of the gear lever being REVERSE and further includes a brake pedal of the vehicle being pressed, whereupon the engine is automatically restarted.

19. The control system of claim 18, further comprising alerting a driver of the vehicle to press the brake pedal when the final position of the gear lever is REVERSE and the brake pedal is not pressed, and wherein the at least one condition includes the final position of the gear lever being REVERSE and further includes the brake pedal being pressed within a predetermined time after the alert, whereupon the engine is automatically restarted.

20. The control system of claim 19, wherein the at least one other condition includes the brake pedal not being pressed within the predetermined time after the alert.

* * * * *